US012789552B2

(12) United States Patent
Kobak

(10) Patent No.: US 12,789,552 B2
(45) Date of Patent: Nov. 10, 2026

(54) SPLIT BEAD SEAT PROTECTOR

(71) Applicant: Boris Kobak, Kleinberg (CA)

(72) Inventor: Boris Kobak, Kleinberg (CA)

( * ) Notice: Subject to any disclaimer, the term of this patent is extended or adjusted under 35 U.S.C. 154(b) by 149 days.

(21) Appl. No.: 18/916,978

(22) Filed: Oct. 16, 2024

(65) Prior Publication Data

US 2026/0103022 A1 Apr. 16, 2026

(51) Int. Cl.
*B60B 21/12* (2006.01)
*B60B 21/02* (2006.01)
*B60B 21/10* (2006.01)

(52) U.S. Cl.
CPC ............ *B60B 21/12* (2013.01); *B60B 21/023* (2013.01); *B60B 21/102* (2013.01); *B60B 2900/5116* (2013.01)

(58) Field of Classification Search
CPC ..... B60B 21/023; B60B 21/102; B60B 21/12; B60B 2900/5116
See application file for complete search history.

(56) References Cited

U.S. PATENT DOCUMENTS 263,859 A 9/1882 Clifton
1,642,897 A 9/1927 Sarver
2,190,611 A 2/1940 Sembdner
3,504,725 A * 4/1970 Roberts .................. B60B 21/10 152/539
3,915,214 A 10/1975 Pile et al.
5,232,034 A * 8/1993 Gergele .................... B60C 5/16 152/394
5,355,923 A * 10/1994 Boni ..................... B60C 15/028 152/381.6
5,632,529 A 5/1997 Wei
5,638,591 A 6/1997 Lamping et al.
5,728,426 A 3/1998 Wei
5,967,212 A 10/1999 Hameed
6,872,425 B2 3/2005 Kaufold et al.
10,773,547 B2 * 9/2020 Wolf ....................... B60B 21/12
2005/0264095 A1 12/2005 Eberhard
2009/0110923 A1 * 4/2009 Gracia-Vega ........... B60B 21/12 428/343
2013/0069421 A1 * 3/2013 Gilbert .................... B60B 21/12 301/95.101

(Continued)

FOREIGN PATENT DOCUMENTS

CN 204451828 U 7/2015
CN 112319130 A * 2/2021 ........... B60B 21/108
DE 19942549 A1 * 4/2001 ......... B60C 15/0206

(Continued)

OTHER PUBLICATIONS

Canadian Intellectual Property Office, International Search Report, Application No. PCT/CA2025/051356, mailed Dec. 29, 2025, 3 pages.

(Continued)

*Primary Examiner* — Adam D Rogers
(74) *Attorney, Agent, or Firm* — ZIEGLER IP LAW GROUP, LLC.

(57) ABSTRACT

An integral alloy vehicle wheel is provided with a replaceable bead seat protector that protects the bead seat portion of the wheel from tire abrasion and subsequent corrosion. The bead seat protector has a split body to aid in mounting the protector over the outer flanges of the vehicle wheel.

17 Claims, 6 Drawing Sheets

(56) References Cited

U.S. PATENT DOCUMENTS

2013/0113268 A1 5/2013 Dimovski

FOREIGN PATENT DOCUMENTS

| | | | | | |
|---|---|---|---|---|---|
| GB | 2199792 | A | * | 7/1988 | ............. B60B 21/10 |
| JP | 2020079045 | A | * | 5/2020 | |
| WO | 2017116408 | A1 | | 7/2017 | |

OTHER PUBLICATIONS

Canadian Intellectual Property Office, Written Opinion of the International Searching Authority, Application No. PCT/CA2025/051356, mailed Dec. 29, 2025, 6 pages.

* cited by examiner

SPLIT BEAD SEAT PROTECTOR

TECHNICAL FIELD

This disclosure relates to vehicle wheels, and in particular to integral light metal alloy wheels composed of alloys of materials such as aluminium or magnesium that can become damaged or suffer corrosion in the area of contact between the wheel and a mounted tire when in use. More particularly, the disclosure relates to a bead seat protector that may be mounted on at least one bead seat portion of the integral vehicle wheel between the wheel and a mounted tire to repair or prevent damage caused by wear or corrosion.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Modern vehicle wheels can be manufactured using many different materials. A common choice among vehicle manufacturers is to use pressed steel wheels, which are strong, stiff, and resistant to accidental damage. They are also easy to produce and cheap to manufacture in large quantities. Compared to other materials, however, steel is heavy, and several varieties of cast light metal alloy wheels have been developed as viable alternatives.

There are two types of alloy wheels commonly available, one the more common aluminium alloy wheel, and the other an expensive magnesium alloy wheel. Titanium and other composite materials are also available for custom applications. The cast aluminium alloy wheels can provide a weight saving compared with a steel wheel that varies from about 30 to 50 percent.

The lighter alloy wheels can also be designed with a thicker flange section, which promotes stiffness and distributes stresses over a wider area. This allows wider tires to be fitted, which improves road-holding ability, especially on corners, and is one of the main reasons for their use on some sports cars. Light alloys are also good conductors of heat and thus allow heat generated by brakes and tires to dissipate faster. The drawback to cast alloy wheels, and particularly the more common aluminium variety, is their susceptibility to corrosion or oxidation when exposed directly to the environment.

To help prevent or retard corrosion, alloy vehicle wheels are coated with a protective finish such as powder coating, lacquer, paint, or polyurethane during the final stages of the manufacturing process. With use, however, the protective finish may be worn away by debris or due to friction and chafing caused by the movement of the tire in its area of contact with the wheel. This wearing away of the finish can leave the alloy exposed directly to the environment. In general, metal, and in particular, alloys commonly used in vehicle wheels, will corrode or oxidize when so exposed. Environmental elements such as moisture and salt from wintertime driving can also accelerate the oxidation process.

Corrosion can be of particular concern in the bead seat portion of the wheel. This area is subject to high stresses, and the presence of corrosion pits can lead to cracking and a risk of fatigue failure. As the corrosion progresses, the tire and wheel assembly can lose its preset air pressure leading to accelerated tire wear, loss in vehicle handling, loss in fuel economy, and eventually total loss of air pressure in the tire.

One proposal to handle this situation is set out in U.S. Pat. No. 5,638,591, Lamping et al., which issued Jun. 17, 1997. This patent illustrates a unitary bead seat protector that is pre-molded with a desired internal contour adapted for a particular wheel, and an external contour suitable for the intended tire. While such structures are useful for typically large wheels having a split rim, they cannot be used with integral wheels where the diameters of the wheel's inner and outer flange portions are greater than the diameters of the wheel's bead seat portions. This design also requires precision manufacturing of the bead seat protector in order to ensure a snug fit on the wheel.

It would be desirable to have a bead seat protector that can be mounted on an integral alloy vehicle wheel to repair or inhibit corrosion of the wheel's bead seat portion.

BRIEF SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one aspect of the present disclosure, a bead seat protector includes a body portion composed of a generally annular ring. The ring has a body portion having a split that extends through it. The split defines a first end portion and a second end portion to the body portion. The first and second end portions have a first surface with a first profile and a second surface with a second profile, respectively. The first and second surfaces overlap, and the first and second profiles cooperate and are configured to inhibit air flow from within a tire.

In accordance with an aspect, the bead seat protector is suitable for use with an integral vehicle wheel having at least one bead seat portion, inner and outer annular lips adapted for holding beads of a tire to the wheel, and a wheel diameter in a region of the at least one bead seat portion that is less than the wheel diameter in the region of the inner and outer lips. The bead seat protector is configured to overlay the bead seat portion and support the beads of the tire.

In accordance with one embodiment of the disclosure, a bead seat protector is composed of a resiliently elastic material to aid in the mounting of the protector on an integral vehicle wheel. In an embodiment, the first and second surfaces will overlap when the bead seat protector is not mounted on a wheel and in a relaxed state, as well as when it is mounted on an integral vehicle wheel. The bead seat protector may also exhibit a generally uniform inner and outer diameter when mounted on an integral vehicle wheel to further inhibit air flow from within the tire.

In one aspect, the first end portion of the bead seat protector includes a tapered first profile and the second end portion of the bead seat protector includes a tapered second profile that is symmetrical to the tapered first profile. The tapered first profile and the tapered second profile are each tapered such that a thickness of each of the first end portion and the second end portion gradually reduces toward a terminal end. The tapered profiles provide a continuous transition between the first and second end portions when the bead seat protector is mounted on an integral vehicle wheel. In a further aspect, each of the tapered first profile and the tapered second profile is configured at an angle relative to a central axis of said bead seat protector, such that the first and second end portions taper at a predefined angle.

In a further aspect of the disclosure, a method is presented for repairing an integral vehicle wheel, and in particular, an integral alloy wheel, that has become corroded or damaged in one or more of the bead seat portions of the wheel through use. The method provides for removing any corroded material and cleaning the at least one bead seat portion of the integral vehicle wheel using any suitable means as understood in the art. Next, at least one bead seat protector is provided in accordance with the present disclosure, which is sealingly affixed to the at least one bead seat portion of the integral vehicle wheel.

In another aspect, a vehicle wheel includes inner and outer annular lips adapted for holding beads of a tire to the wheel, at least one bead seat portion, wherein a wheel diameter in a region of the bead seat portion is less than the wheel diameter in the region of the inner and outer lips, and a bead seat protector sealingly affixed to the at least one bead seat portion. The bead seat protector comprising a body portion including a generally annular ring and defining a split, the split creating a first end portion and a second end portion in the body portion. The first end portion includes a first surface, the first surface having a first profile, and the second end portion includes a second surface, the second surface having a second profile. The first surface and the second surface overlap and the first profile and the second profile cooperate and are configured to inhibit air flow from within the tire. In a further aspect, the first end portion of the bead seat protector includes a tapered first profile and the second end portion of the bead seat protector includes a tapered second profile that is symmetrical to the tapered first profile. The tapered first profile and the tapered second profile are each tapered such that a thickness of each of the first end portion and the second end portion gradually reduces toward a terminal end.

In a further aspect, a bead seat protector for use with a tire and wheel assembly includes a body portion comprising a generally annular ring, and a first end portion and a second end portion at opposite ends of the body portion. The first end portion includes a first surface having a tapered first profile and the second end portion includes a second surface having a tapered second profile. The first surface and the second surface are configured to overlap in operational position when the bead seat protector is installed on a wheel of the tire and wheel assembly. The tapered first profile and the tapered second profile cooperate and are configured to inhibit air flow from within a tire of the tire and wheel assembly in the operational position. In a further aspect, the tapered first profile is symmetrical to said tapered second profile, and each of the tapered first profile and the tapered second profile is configured at an angle relative to a central axis of the bead seat protector, such that the first and second end portions taper at a predefined angle. In a still further aspect, the body portion is composed of a resiliently elastic material.

A better understanding of the disclosure, together with additional aspects and advantages of the disclosure may be understood from reference to the accompanying drawings, and to the following description.

BRIEF DESCRIPTION OF THE DRAWINGS

In the accompanying drawings.

DETAILED DESCRIPTION

Figure 1:
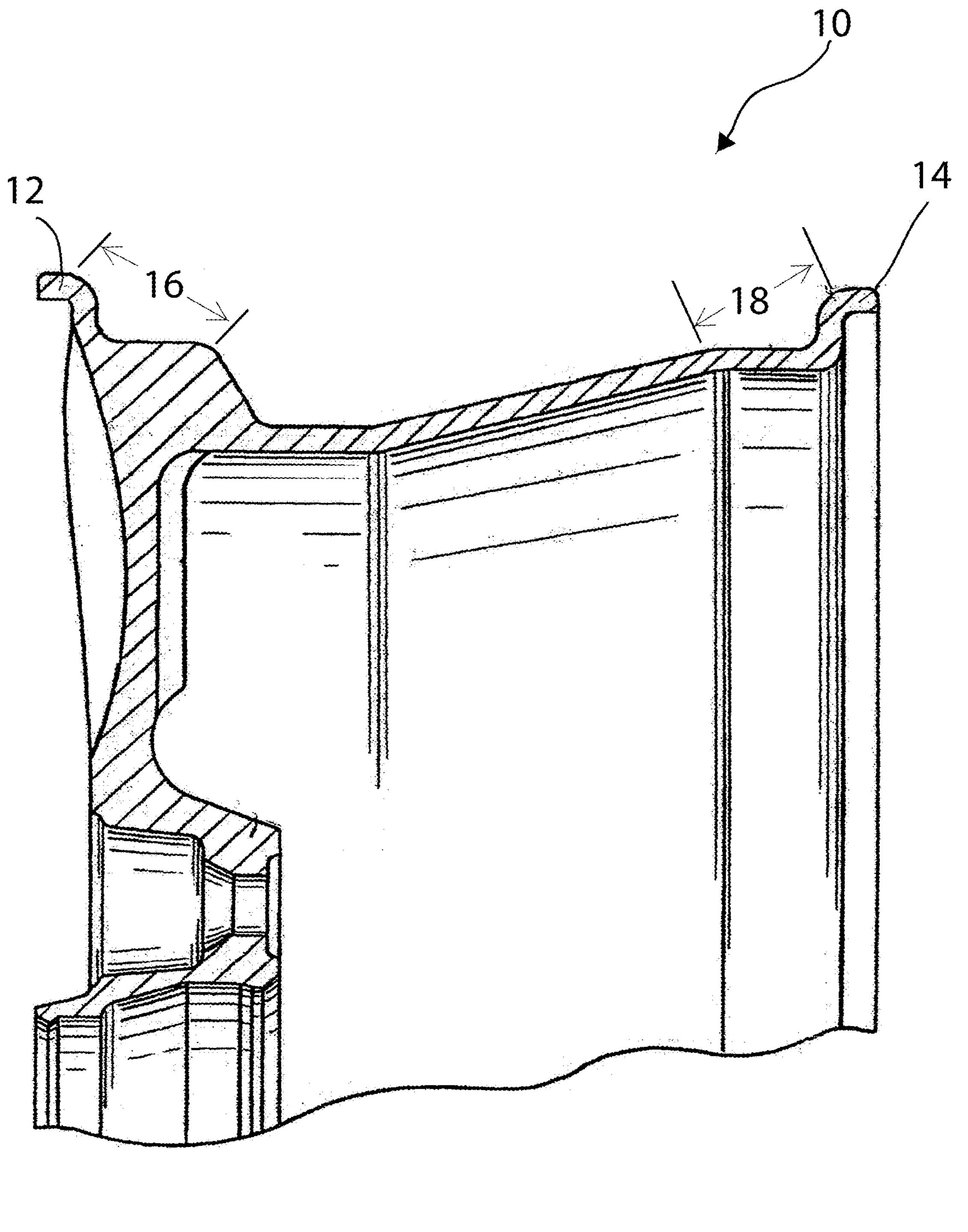
FIG. 1 is a partial sectional view of a typical alloy vehicle wheel.

Referring to FIG. 1, an embodiment of a vehicle wheel is shown as a representative integral wheel in a partial sectional view at 10. The wheel includes an annular outer lip 12 and an annular inner lip 14 adapted for holding the beads of a tire (not shown), an outer bead seat portion 16 and an inner bead seat portion 18. Associated with inner and outer lips 12, 14, and the inner and outer bead seat portions 16, 18, are wheel diameters in which the wheel diameter at each of the lips is greater than at the bead seat portions. The size and shape of these elements may be selected from a number of standard combinations, or may be customized for a particular application. For example, in automotive applications, typical tire bead profiles and wheel contour designations may be characterized as 'J' or 'JJ', which establish the shape and standardized dimensions of these elements.

Figure 2:
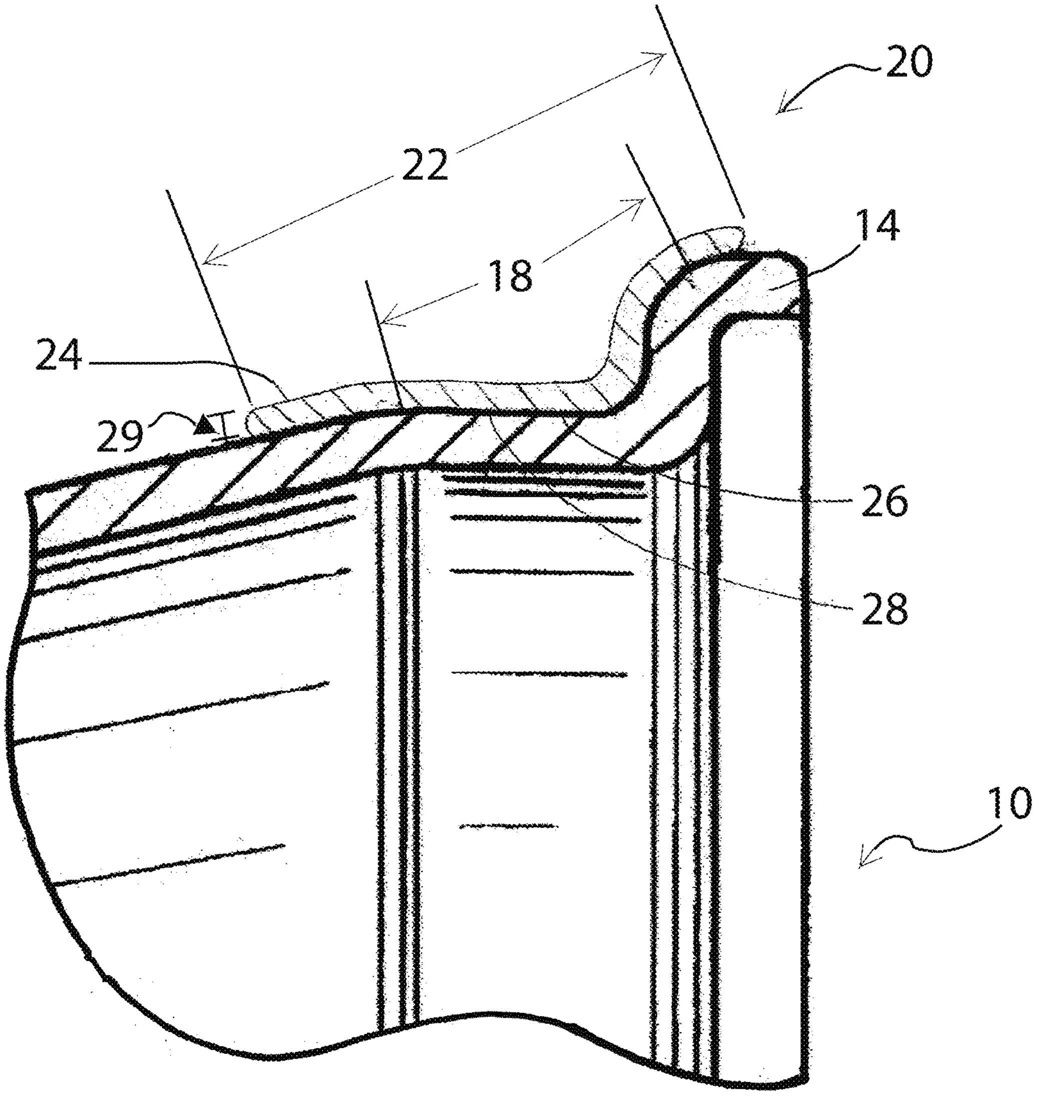
FIG. 2 a partial sectional view of a portion of the alloy vehicle wheel of FIG. 1 with a first embodiment of a bead seat protector in accordance with one embodiment of the present disclosure mounted thereon.

FIG. 2 illustrates a partial sectional view of one embodiment of a bead seat protector 20 in accordance with the present disclosure mounted on one bead seat portion of the representative wheel depicted in FIG. 1. When installed, the bead seat protector 20 functions as a wear layer, and is adapted for positioning between the bead seat portion of an underlying wheel 10 and the bead of a tire (not shown). The bead seat protector 20 has a width 22, and a thickness 29 defined by a radial upper surface 24 and a radial lower surface 26. The bead seat protector 20 must be of sufficient thickness 29 to perform its function as a wear layer. In one aspect, the bead seat protector 20 has a thickness of approximately 0.6 mm to 0.8 mm. The upper surface 24 defines an outer diameter and the lower surface 26 defines an inner diameter. Here, reference to the terms inner diameter and outer diameter are meant to mean the entire ordered set of multiple discrete diameter values that define the profile of the bead seat protector 20 as one travels axially along the lower surface 26 and upper surface 24, respectively. A reference to a diameter being uniform is meant to mean that each diameter in the above ordered sets, when measured in a plane perpendicular to the axis of the body portion 30 (see FIG. 3), is generally equal to any other co-planar diameter at any point about the circumference of the body portion 30. In one embodiment, the contour of the upper surface 24 and lower surface 26 correspond to the bead of the selected tire (not shown) and underlying wheel 10, respectively. The width of the protector 22 is selected to be at least equal to the portion of the selected bead seat portion 16 or 18 that is normally in contact with a mounted tire, and extends beyond the bead seat portion 16 or 18 to better protect the underlying wheel 10.

In one aspect, the bead seat protector 20 is formed of ferrous or non-ferrous metal, and in one embodiment, from stainless steel. In another aspect, the bead seat protector 20 may be formed of spring steel, plastics or other organic resins. In a further aspect, protector 20 is capable of resiliently elastic deformation to aid in the mounting of the protector 20 on an integral vehicle wheel as described in greater detail below.

Figure 3:
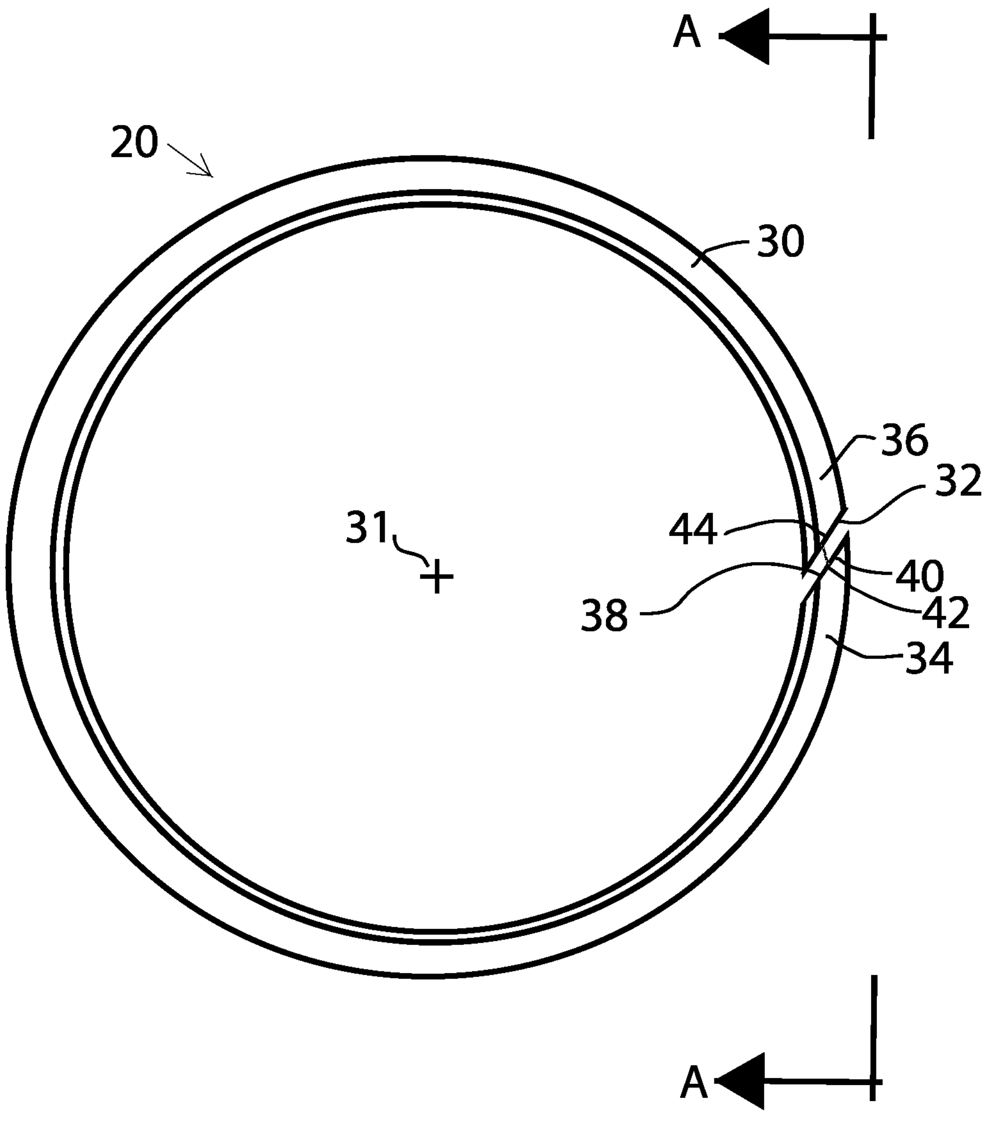
FIG. 3 is a back view of a bead seat protector in accordance with another embodiment of the present disclosure.
Figure 4:
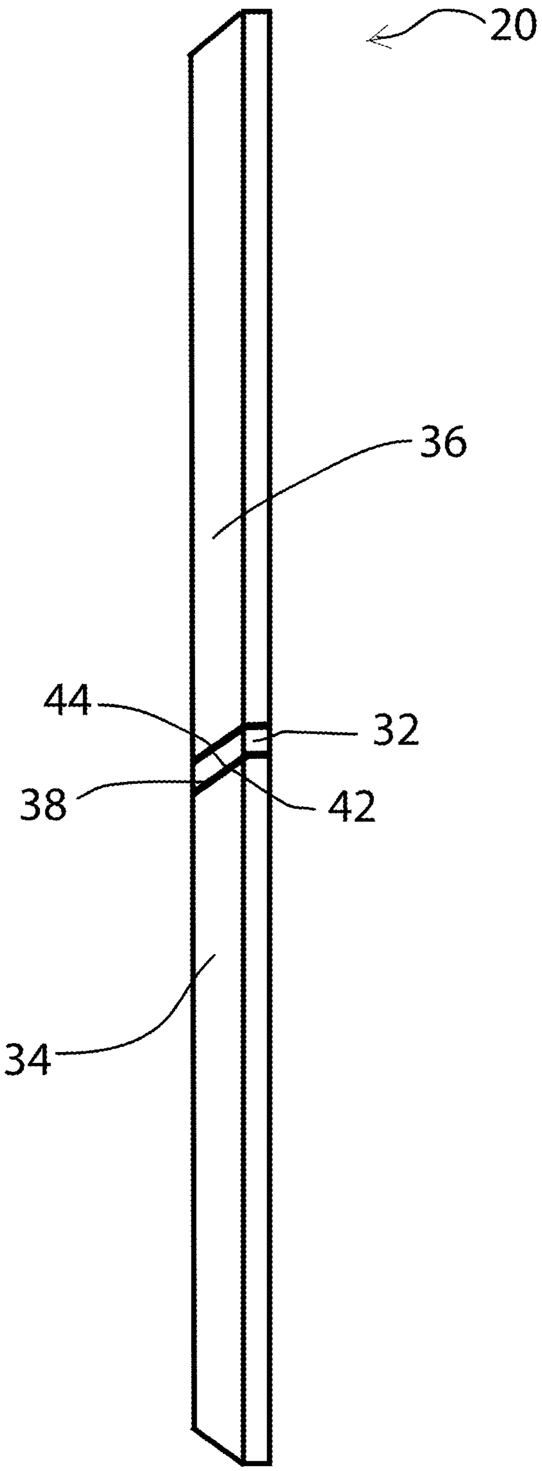
FIG. 4 is a side view of the bead seat protector from line A-A of FIG. 3.

Referring now to FIGS. 3 and 4, back and side views of the bead seat protector 20 are illustrated, respectively. The bead seat protector 20 is comprised of a body portion 30 shaped as a generally annular ring having a central axis 31. The body portion 30 has a split 32 that extends through the body portion 30 and creates a first end portion 34 and a second end portion 36 in the body portion 30. The first end portion 34 has a first surface 38 having a first profile 40. Similarly, the second end portion 36 has a second surface 42 having a second profile 44. In accordance with this embodiment, the split 32 extends through the body portion 30 on a diagonal with respect to the radius located at the split 32 in the annular ring. The first surface 38 and the second surface 42 also overlap radially, and the first end portion 34 and second end portion 36 substantially abut circumferentially so that the upper surface 24 and lower surface 26 are respectively generally continuous when the bead seat protector 20 is mounted on an integral wheel 10.

In a further aspect of this embodiment, first profile 40 and second profile 44 cooperate to inhibit fluid flow between the first surface 38 and second surface 42, thereby creating a seal for maintaining air pressure within the tire. FIG. 3 depicts the first and second profiles 40, 44 as generally planar, but one skilled in the art will appreciate that other embodiments of the current disclosure may have profiles that take other forms in either the axial or circumferential directions, such as, for example, curved, keyed or sinusoidal.

As previously mentioned, the bead seat protector 20 may be formed of a resiliently elastic material. One benefit to having this property is for facilitating the mounting of the bead seat protector 20 on an integral vehicle wheel where the inner and outer lips 12, 14 that hold the beads of the tire to the wheel have diameters that are greater than the bead seat portions 16, 18 of the wheel. The split 32 allows the resiliently elastic body portion 30 to be flexed enough to pass over one of the wheel's inner or outer lips 12 or 14, and then return substantially to its original shape. This allows the bead seat protector 20 to be installed in accordance with the present disclosure without further mechanical adjustment. It will be appreciated that if the bead seat protector 20 is formed of a resiliently elastic material, that it would be preferable that the first surface 38 and second surface 42 overlap both before and after installation to facilitate establishing a fluid tight seal between the first surface 38, and second surface 42, between the lower surface 26 and bead seat portion 16 or 18, and upper surface 24 and the bead of a tire (not shown) in the region between the first end portion 34 and the second end portion 36 when installed.

Figure 5:
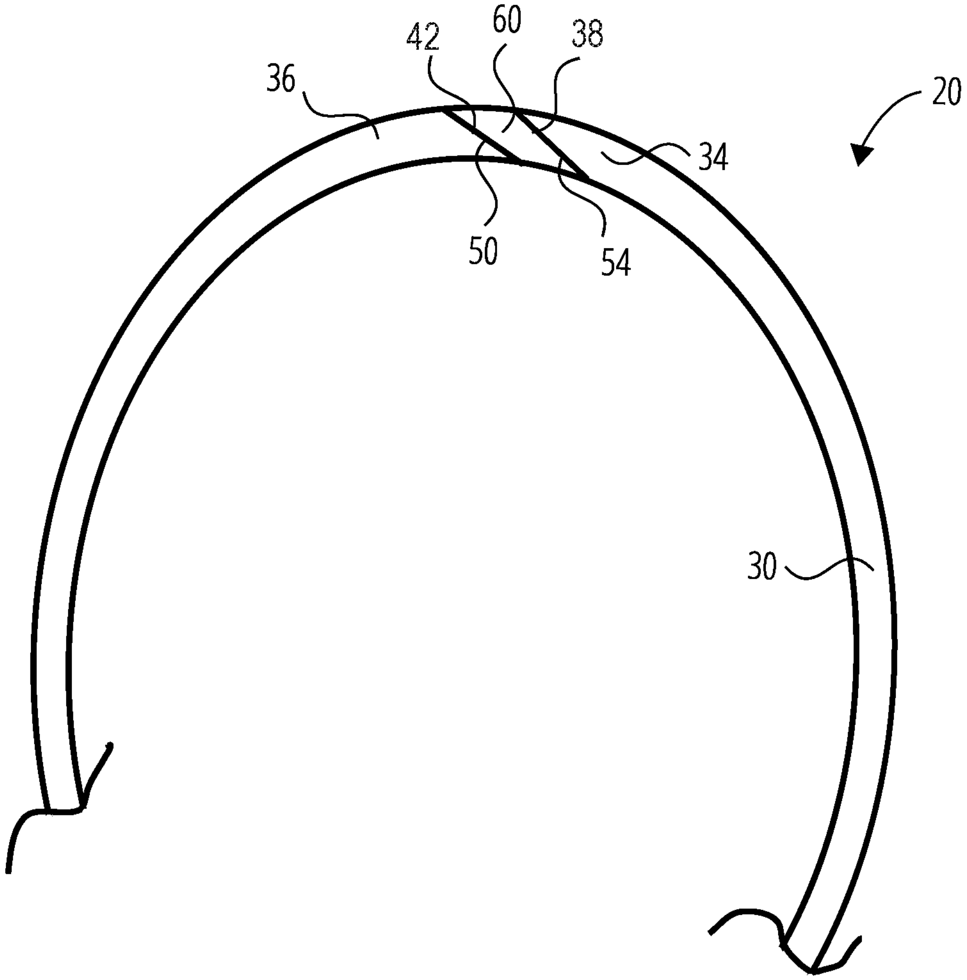
FIG. 5 is a sectional view of the end portions of a bead seat protector in an overlapping position in accordance with one embodiment.
Figure 6:
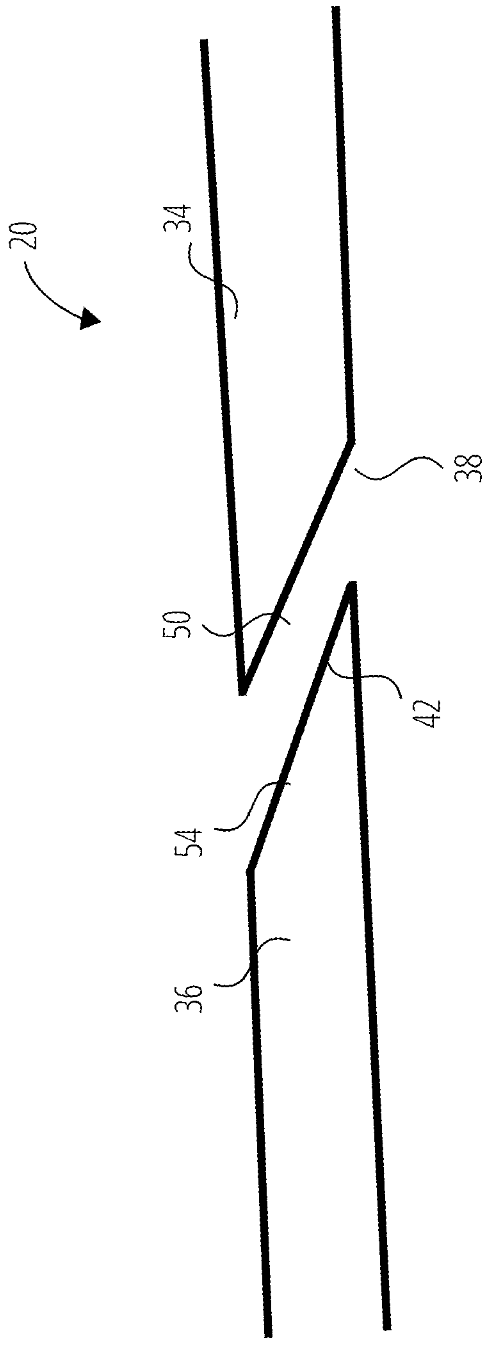
FIG. 6 is a sectional view of the end portions of a bead seat protector in a split position in accordance with one embodiment.

Referring now to FIGS. 5 and 6, sectional views of the end portions of the bead seat protector are illustrated in overlapping and split positions, respectively. The body portion 30 of the bead seat protector 20 has a first end portion 34 and a second end portion 36. The first end portion 34 has a first surface 38 having a tapered first profile 50 such that the thickness of the first end portion 34 gradually reduces toward a terminal end, thereby forming the tapered first profile 50. Similarly, the second end portion 36 has a second surface 42 having a tapered second profile 54 such that the thickness of the second end portion 36 gradually reduces toward the terminal end, thereby forming the tapered second profile 54. In accordance with this embodiment, the first surface 38 and the second surface 42 overlap radially in the region 60 with the tapered first profile 50 and the tapered second profile 54 cooperating to inhibit air flow between the first surface 38 and second surface 42, thereby creating a seal for maintaining air pressure within the tire. In the overlapping position, first end portion 34 and the second end portion 36 substantially abut circumferentially so that the upper surface 24 and lower surface 26 are, respectively, generally continuous when the bead seat protector 20 is mounted on an integral wheel 10.

In one aspect, the tapered first profile 50 of the first end portion 34 is symmetrical to the tapered second profile 54 of the second end portion 36 such that the first end portion 34 and the second end portion 36 align continuously when overlapped and/or when the bead seat protector 20 is mounted on a wheel. This symmetrical tapering reduces material bulk at the overlapping region and enhances the sealing integrity by ensuring uniform pressure distribution along the body portion 30. Here, "symmetrical" refers to the structure or configuration where two or more profiles, surfaces, or features exhibit symmetry to a degree that achieves the intended functionality or result. This encompasses both perfectly symmetrical configurations as well as those that are symmetrical within acceptable fault tolerances. Such tolerances allow for minor deviations from perfect symmetry that do not materially affect the intended performance or function, while still maintaining the general symmetrical characteristics required for its operation. For instance, the tapered first profile 50 of the first end portion 34 and the tapered second profile 54 of the second end portion 36 are considered symmetrical if they align and overlap in a manner that achieves uniform pressure distribution and effective sealing, regardless of any minor differences.

In one embodiment, each of the tapered first profile 50 and the tapered second profile 54 is configured at an angle relative to the central axis 31 (see FIG. 3) of the bead seat protector 20, such that the first and second end portions taper at a predefined angle. The predefined angle may be selected based on the dimensions and material properties of the bead seat protector 20 relative to the wheel to improve sealing effectiveness. The angled profile of the end portions increases the contact area at the overlapping region 60, further optimizing the overlap for improved sealing when mounted on a wheel. The angled and tapered profiles at the end portions also allow for improved conformity to surface irregularities on the bead seat portion and/or the wheel. Additionally, the angled and tapered profiles at the end portions may help distribute mechanical stress evenly across the overlapping region, reducing fatigue and prolonging the operational lifespan of the bead seat protector.

In a further aspect of this embodiment of the disclosure, the diameter and contour of the lower surface 26 (see FIG. 2) may be selected to cooperate with the bead seat portion 16 or 18 of the wheel 10, and the diameter and contour of the upper surface 24 may be selected to cooperate with the bead of a selected tire (not shown). In one embodiment, the first end portion 34 and the second end portion 36 substantially abut circumferentially, and the upper surface 24 and lower surface 26 are respectively generally continuous when the bead seat protector 20 is mounted on an integral wheel 10. This arrangement facilitates the establishment of a fluid tight joint between the first surface 38 and second surface 42, between the lower surface 26 and bead seat portion 16 or 18, and upper surface 24 and the bead of a tire in the region between the first end portion 34 and the second end portion 36 when installed.

The bead seat protector 20 may be secured against rotation with respect to the wheel by bonding the lower surface 26 to the underlying wheel 10 by an adhesive layer 28 that is chemically compatible with the material of the underlying wheel and that of the bead seat protector 20. Where the underlying wheel is formed of an aluminum alloy and the bead seat protector 20 is formed of stainless steel, adhesive layer 28 may be any suitable two-part structural epoxy adhesive such as, for example, Loctite™ EA 9340 or 3M™ Scotch-Weld™ EA 2216. Alternatively, the bead seat protector may be restrained from movement when installed by other means known in the art. Such other means may include mechanical resistance caused by sizing a bead seat protector 20 formed of a resiliently elastic material with an inner diameter before installation that is slightly smaller than the diameter of the wheel in the bead seat portion 16 or 18, or compressive force exerted by an installed and inflated tire.

In accordance with a further aspect of the disclosure, an integral alloy vehicle wheel with a bead seat portion 16 or 18 that has suffered damage or corrosion through use is repaired and reconditioned for use with the bead seat protector 20. While it is not required that both bead seat portions of the integral vehicle wheel be treated, it is likely that both will have suffered similar amounts of damage and will require repair to return the vehicle wheel to operation. The tire and wheel assembly must be removed from the vehicle, and the tire must be dismounted from the wheel. At least one bead seat portion 16 or 18 of the wheel is then cleaned of any corrosion or oxides of the wheel's alloy materials. It will be appreciated by those skilled in the art that cleaning may be done by several means, including, for example, abrasion with sand or emery paper, grinding with wire or abrasive disks on a grinding device, or turning the wheel on a lathe. Although several cleaning methods are available, the preferred means of cleaning is by way of sand blasting.

Having cleaned the bead seat portion of the vehicle wheel to remove all the corroded material leaving no corroded areas, a chemical cleaner may be used on the cleaned area to remove any oils or silicone residue that may still be present. An example of a suitable chemical cleaner is 3M™ General Purpose Adhesive Cleaner (PN 08984). In one aspect, a layer of epoxy, specified for applications involving the wheel's particular alloy materials, is then applied to the cleaned area. This layer will seal the cleaned alloy portion from the environment thereby retarding further corrosion or oxidation. An example of a suitable epoxy is Loctite EA 9340.

At least one bead seat protector 20 in accordance with the present disclosure is then provided. The bead seat protector 20 is spread apart at the split 32 so that the inner diameter of the elastic body portion 30 is sufficient to pass axially over either the wheel's inner lip 12 or outer lip 14. The bead seat protector is then seated in the selected bead seat portion of the wheel 16 or 18 ensuring that the first surface 38 and the second surface 42 overlap radially and the first profile 40 and second profile 44 cooperate to inhibit air flow from within the tire as already described. In this regard, the epoxy layer may function to seal any remaining gaps that may exist between the wheel and the bead seat protector 20 due to dents or any remaining corrosion scars in the wheel surface. The epoxy layer may also function as the adhesive layer 28 to fixedly secure the bead seat protector from rotation with respect to the wheel. Habitually, epoxy resins require a curing period before they can be subjected to loads or operation. If the epoxy selected requires a curing period, such time will have to pass before the tire can be mounted on the wheel and bead seat protector assembly.

While the above embodiment describes repairing a used integral vehicle wheel by removing degraded material from at least one bead seat portion and sealingly affixing the bead seat protector, it is understood that the same method can be applied to the manufacturing of new wheels. Therefore, in accordance with a further aspect of the disclosure, a new vehicle wheel can be manufactured with the bead seat protector 20 sealingly affixed to at least one bead seat portion 16 or 18 of the wheel.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The invention claimed is:

1. A bead seat protector for use with an integral vehicle wheel having inner and outer annular lips adapted for holding beads of a tire to the wheel, at least one bead seat portion, and a wheel diameter in a region of the at least one bead seat portion that is less than the wheel diameter in a region of the inner and outer lips, the bead seat protector configured to overlay the bead seat portion and support the beads of the tire, the bead seat protector comprising:

a body portion;

said body portion comprising a generally annular ring, said body portion defining a split, said split creating a first end portion and a second end portion in said body portion;

said first end portion having a first surface, said first surface having a first profile;

said second end portion having a second surface, said second surface having a second profile;

wherein said first surface and said second surface overlap;

wherein said first profile and said second profile are configured to inhibit air flow from within the tire by inhibiting air flow between said first surface and said second surface; and wherein said first profile comprises a tapered first profile and said second profile comprises a tapered second profile such that a thickness of each of the first end portion and the second end portion reduces toward a terminal end.

2. The bead seat protector of claim 1, wherein said tapered first profile is symmetrical to said tapered second profile.

3. The bead seat protector of claim 1, wherein said first surface and said second surface overlap radially when said body portion is mounted on said integral vehicle wheel.

4. The bead seat protector of claim 1, wherein said first end portion and said second end portion abut circumferentially and said tapered first profile and said tapered second profile are configured to provide a continuous transition between said first end portion and said second end portion when said body portion is mounted on said integral vehicle wheel.

5. The bead seat protector of claim 1, wherein each of the tapered first profile and the tapered second profile is configured at an angle relative to a central axis of said bead seat protector, such that said first and second end portions taper at a predefined angle.

6. The bead seat protector of claim 1, wherein said body portion is composed of a resiliently elastic material.

7. The bead seat protector of claim 6, wherein said first surface and said second surface overlap when said bead seat protector is not mounted on said integral vehicle wheel.

8. The bead seat protector of claim 6, wherein said first surface and said second surface overlap when said body portion is mounted on said integral vehicle wheel.

9. The bead seat protector of claim 8, wherein said body portion has an outer diameter, said outer diameter being generally uniform when said body portion is mounted on said integral vehicle wheel; and wherein said body portion has an inner diameter, said inner diameter being generally uniform when said body portion is mounted on said integral vehicle wheel.

10. The bead seat protector of claim 6, wherein the elastic material is metal.

11. A method for repairing at least one bead seat portion of an integral vehicle wheel, the vehicle wheel having inner and outer annular lips adapted for holding beads of a tire to the vehicle wheel, and a wheel diameter in a region of the bead seat portion that is less than the wheel diameter in a region of the inner and outer lips, the method comprising:

removing degraded material from the at least one bead seat portion of the vehicle wheel;

providing at least one bead seat protector according to claim 1, to overlay the at least one bead seat portion; and sealingly affixing the at least one bead seat protector to the at least one bead seat portion of the vehicle wheel.

12. A vehicle wheel comprising:

inner and outer annular lips adapted for holding beads of a tire to the wheel, at least one bead seat portion, wherein a wheel diameter in a region of the bead seat portion is less than the wheel diameter in a region of the inner and outer lips; and a bead seat protector sealingly affixed to the at least one bead seat portion, said bead seat protector comprising a body portion, said body portion comprising a generally annular ring and defining a split, said split creating a first end portion and a second end portion in said body portion;

wherein said first end portion includes a first surface, said first surface having a first profile, and said second end portion includes a second surface, said second surface having a second profile;

wherein said first surface and said second surface overlap; and wherein said first profile comprises a tapered first profile and said second profile comprises a tapered second profile such that a thickness of each of the first end portion and the second end portion reduces toward a terminal end; and wherein said tapered first profile and said tapered second profile re configured to inhibit air flow from within the tire by inhibiting air flow between said first surface and said second surface.

13. A bead seat protector for use with a tire and wheel assembly, the tire and wheel assembly including a tire and an integral vehicle wheel having inner and outer annular lips adapted for holding beads of the tire to the wheel, at least one bead seat portion, and a wheel diameter in a region of the at least one bead seat portion that is less than a wheel diameter in a region of the inner and outer annular lips, the bead seat protector configured to overlay the at least one bead seat portion, support the beads of the tire, and be sealingly affixed to the at least one bead seat portion, the bead seat protector comprising:

a body portion comprising a generally annular ring, said body portion defining a split, said split creating a first end portion and a second end portion in said body portion; and said first end portion including a first surface having a tapered first profile and said second end portion including a second surface having a tapered second profile such that a thickness of each of the first end portion and the second end portion reduces toward a terminal end;

wherein said first surface and said second surface are configured to overlap in an operational position when the bead seat protector is installed on the wheel of the tire and wheel assembly, and wherein the tapered first profile and the tapered second profile are configured to inhibit air flow from within the tire of the tire and wheel assembly in the operational position by inhibiting air flow between said first surface and said second surface.

14. The bead seat protector of claim 13, wherein each of the tapered first profile and the tapered second profile is configured at an angle relative to a central axis of said bead seat protector, such that said first and second end portions taper at a predefined angle.

15. The bead seat protector of claim 13, wherein said tapered first profile is symmetrical to said tapered second profile.

16. The bead seat protector of claim 13, wherein said body portion is composed of a resiliently elastic material.

17. The bead seat protector of claim 13, wherein said body portion is composed of stainless steel.

* * * * *